United States Patent [19]

Hong et al.

[11] Patent Number: 5,527,471
[45] Date of Patent: Jun. 18, 1996

[54] IRIDIUM MATERIAL FOR HYDROTHERMAL OXIDATION ENVIRONMENTS

[75] Inventors: Glenn T. Hong, Tewksbury; Vladimir A. Zilberstein, Brookline, both of Mass.

[73] Assignee: Modar, Inc., Natick, Mass.

[21] Appl. No.: 382,674

[22] Filed: Feb. 2, 1995

[51] Int. Cl.⁶ .................................................. C02F 11/08
[52] U.S. Cl. .............................. 210/761; 210/762; 422/7; 422/240; 422/241
[58] Field of Search ..................................... 210/761, 762, 210/763, 766; 422/240, 241, 7

[56] References Cited

U.S. PATENT DOCUMENTS

| | | | |
|---|---|---|---|
| 2,944,396 | 7/1960 | Barton et al. | 210/762 |
| 3,804,756 | 4/1974 | Callahan et al. | 210/763 |
| 4,082,900 | 4/1978 | Shimogori et al. | 422/241 |
| 4,292,953 | 10/1981 | Dickinson | 126/263 |
| 4,741,833 | 5/1988 | Sheikh | 210/763 |
| 5,106,513 | 4/1992 | Hong | 210/759 |
| 5,130,080 | 7/1992 | Niedrach | 376/305 |
| 5,135,709 | 8/1992 | Andresen et al. | 376/305 |
| 5,358,645 | 10/1994 | Hong | 210/761 |
| B1 4,338,199 | 11/1988 | Modell | 210/721 |

OTHER PUBLICATIONS

Materials of Construction for Chemical Engineering Equipment, *Chemical & Metall. Eng.*, Sep./1944, p. 105.

*Primary Examiner*—Peter A. Hruskoci
*Attorney, Agent, or Firm*—Nydegger & Associates

[57] ABSTRACT

A process for hydrothermal oxidation of combustible materials in which, during at least a part of the oxidation, corrosive material is present and makes contact with at least a portion of the apparatus over a contact area on the apparatus. At least a portion of the contact surface area comprises iridium, iridium oxide, an iridium alloy, or a base metal overlaid with an iridium coating. Iridium has been found to be highly resistant to environments encountered in the process of hydrothermal oxidation. Such environments typically contain greater than 50 mole percent water, together with oxygen, carbon dioxide, and a wide range of acids, bases and salts. Pressures are typically about 27.5 to about 1000 bar while temperatures range as high as 800° C.

24 Claims, 1 Drawing Sheet

IRIDIUM MATERIAL FOR HYDROTHERMAL OXIDATION ENVIRONMENTS

This invention was made with Government support under Subcontract No. C94-170508 awarded by the Department of Energy. The Government has certain rights in this invention.

BACKGROUND OF THE INVENTION

1. Field of the Invention

This invention relates to a method of oxidizing combustible materials in a high temperature water oxidation apparatus. More particularly, this method provides for an iridium contact area on the apparatus so as to alleviate the effect of corrosive material present in the process stream.

2. Description of the Related Art

The process of "wet oxidation" has been used for the oxidation of compounds in an aqueous stream for some time. Generally, it involves the addition of an oxidizing agent, typically air or oxygen, to an aqueous stream at elevated temperatures and pressures, with the resultant "combustion" of oxidizable materials directly within the aqueous phase. This wet oxidation process is characterized by operating pressures of 25 to 250 bar (440 to 3630 psia) and operating temperatures of 150° to 370° C. At these conditions, the gas phase oxidation is quite slow and the majority of the oxidation reaction is carried out in the liquid phase. Thus, the reactor operating conditions are typically maintained at or about the saturation point of water, such that at least a part of the water is present in liquid form. This wet oxidation process has several drawbacks. First, it is unsuitable to adequately handle refractory compounds. Second, it is characterized by slow reaction times. Third, due to the low temperature of the process, heat recovery is limited.

In light of such limitations, aqueous oxidation processes were extended to higher temperatures and pressures. In U.S. Pat. No. 2,944,396 to Barton et al., the addition of a second oxidation stage after a wet oxidation reactor is taught. Unoxidized volatile combustibles which accumulate in the vapor phase of the first stage wet oxidation reactor are oxidized in a second stage, which is operated at temperatures above the critical temperature of water of about 374° C. U.S. Pat. No. 4,292,953 to Dickinson, discloses a modified wet oxidation process for power generation from coal and other fuels in which, as heat is liberated by combustion, the reaction mixture exceeds the critical temperature of water, with operating pressures of about 69 bar (1000 psi) to about 690 bar (10,000 psi) spanning both the sub- and supercritical water pressure ranges. U.S. Pat. No. 4,338,199 to Modell, discloses a wet oxidation process which has come to be known as supercritical water oxidation (SCWO) because in some implementations oxidation occurs essentially entirely at conditions supercritical in temperature (>374° C.) and pressure (>about 3200 psi or 220 bar) for water. SCWO at 500°–650° C. and 250 bar has been shown to give rapid and near complete oxidation of organic compounds. A related process known as supercritical temperature water oxidation (STWO) can provide similar oxidation effectiveness for certain feedstocks but at lower pressure. This process has been described in U.S. Pat. No. 5,106,513 to Hong, and utilizes temperatures in the range of 600° C. and pressures between 25 and 220 bar.

These aqueous oxidation processes will hereinafter be referred to collectively as "hydrothermal oxidation" ("HTO") if carried out at a temperature in the range of about 374° C. to about 800° C. and pressures above about 25 bar. Characteristics of the HTO process will be described below for the specific case of SCWO, though other HTO environments will have much in common.

SCWO may be compared to incineration processes since its efficiency towards oxidizable materials is almost 100%. Indeed, much of the process development to date in SCWO has been directed toward treatment of sludges or toxic and hazardous wastes. Such materials could likewise be subjected to an incineration process.

Other potential feedstocks for the SCWO process include those wastes which are currently being handled by deep well injection techniques and wastes which have either been accumulated or spilled, including mixed radioactive/organic wastes. Due to the wide variety of potential feedstocks, the species of interest to the SCWO process span virtually the entire periodic table.

The oxidation occurring in the SCWO process is comparable to incineration in that carbon and hydrogen form the conventional combustion products $CO_2$ and $H_2O$. Halogenated hydrocarbons may form strong acids, for example, chlorinated hydrocarbons (CHCs) may give rise to HCl. The formation of strong halogen acids may lead to acid corrosion problems for the processing equipment. In the past, alkali has been added to mitigate acid corrosion problems.

In contrast to normal combustion, which forms $SO_2$, the final product of sulfur oxidation in SCWO is sulfate anion. As in the case of chloride, alkali may be intentionally added to avoid high concentrations of sulfuric acid. Similarly, the product of phosphorus oxidation is phosphate anion.

While it is frequently desirable to neutralize oxidation product anions via alkali addition, neutralization of cations is not usually necessary. Feedstocks containing excess non-combustible cations are generally self-neutralized. by the $CO_2$ which evolves from oxidation. For example, a stream containing organic sodium salts will yield sodium carbonate as a product. Ammonium, another common cation, is converted to water and nitrogen ($N_2$) or nitrous oxide ($N_2O$) in the SCWO process, and so does not require neutralization.

A key advantage of SCWO over incineration is the lack of $NO_x$ formation due to the relatively low temperature of operation. Oxidized forms of nitrogen, e.g., organic nitro-compounds and nitrate anion, have been found to form $N_2$ or $N_2O$. When air is used as the oxidizing agent, $N_2$ passes through the system as an inert.

While chemical equilibria under SCWO conditions has been fairly well characterized, much remains to be learned about chemical kinetics and reaction mechanisms. The situation is complicated by the wide range of densities which may exist in supercritical water systems. At typical reactor conditions of 500° to 600° C., the supercritical phase density is on the order of 0.1 g/cc. Reaction mechanisms are of the free radical type as with normal combustion, but can be greatly affected by the higher density and water concentration which characterize SCWO conditions. On the other hand, at temperatures closer to the critical point, or in dense supercritical brine phases, densities of 0.5 to 1 g/cc are obtained and ionic reaction mechanisms may dominate.

As indicated by the density employed under typical reactor conditions (0.1 g/cc), the distance between water molecules is considerably greater than the distance between molecules in normal liquid water. The disruption of hydrogen bonding causes the water molecules to lose the molecular ordering which is responsible for many of the properties of normal liquid water. In particular, solubility behavior approximates that of high pressure steam rather than that of liquid water. Smaller polar and nonpolar organic compounds, with relatively high volatility, exist as vapors at typical SCWO conditions, and hence are completely miscible with the supercritical water. Gases such as $N_2$, $O_2$, and $CO_2$ show similar miscibility. Larger organic compounds, such as polymers, pyrolyze or hydrolyze to smaller molecules at typical SCWO conditions, thereby resulting in solubilization via chemical reaction. The loss of bulk polarity of the water phase has striking effects on normally water-soluble salts, as well. No longer readily solvated by water molecules, they precipitate out as solids or dense brines. The small salt residual which is soluble in the supercritical phase is largely present in molecular form, e.g., as NaCl molecules. Heavy metal oxides, having low solubility in liquid water, retain their low solubility at supercritical water conditions. Exceptions exist and high solubilities occur, however, when a metal forms a volatile salt or oxide at reactor temperatures.

The characterization of solubility behavior in the preceding paragraph has been expressed in relation to pure supercritical water. In actual SCWO systems, this behavior may be greatly altered by the presence of large quantities of gases and salts. In many applications, for example, the mass of "noncondensible" gases in the reactor may exceed the mass of water. The presence of noncondensible gases and salts in the SCWO reactor encourages the separation of phases and is similar to the "salting out" phenomenon of gases from solution.

The complexity and uniqueness of the SCWO environment, combined with the elevated temperature and pressure requirements, presents a significant challenge in the selection of materials of construction for commercial applications.

While stainless steel has proven suitable for research in dealing with mixtures of water, oxygen, and hydrocarbons, commercial systems are required to handle a variety of acidic and alkaline streams, as well as streams containing a significant quantity of salts. High nickel alloys, in particular Alloy C276 and Alloy 625, have been used in testing. However, unacceptably high corrosion rates are observed with these alloys for many streams of interest. Furthermore, prolonged exposure to and cycling of these materials at reactor temperatures leads to a degradation of their mechanical properties. Both alloys are subject to embrittlement, thereby leading to the increased possibility of cracking and catastrophic failure.

A number of metals, alloys and ceramics have been tested. Recently, U.S. Pat. No. 5,358,645 (herein incorporated by reference) disclosed the use of zirconia based ceramics for the contact surface area of an apparatus for high temperature water oxidation of combustible materials. However, the brittleness of ceramics and their sensitivity to thermal shock limits the situations in which they are useful.

Thus, the presently known materials employed in hydrothermal oxidation reactors suffer from high corrosion rates, poor resistance to thermal cycling, and poor service life.

A need exists therefore for a material or a coating which demonstrates greater resistance to hydrothermal oxidation conditions. In particular, a need exists for a material or coating which may be commercially useful for containing the corrosive environment of the hydrothermal oxidation reactor.

SUMMARY OF THE INVENTION

It is an object of this invention to provide a process for hydrothermal oxidation in a hydrothermal oxidation apparatus having a contact area, where appropriate, which is resistant to the corrosive environment and thermal variations inherent in a hydrothermal oxidation reactor.

The present invention relates to a method of high temperature water oxidation comprising contacting, in an aqueous phase, the combustible material and the oxidizing agent in an apparatus having a contact area resistant to the corrosive material present, the contact area comprising iridium, iridium oxide, or an iridium alloy.

DETAILED DESCRIPTION OF THE EXEMPLARY EMBODIMENTS

Figure 1:
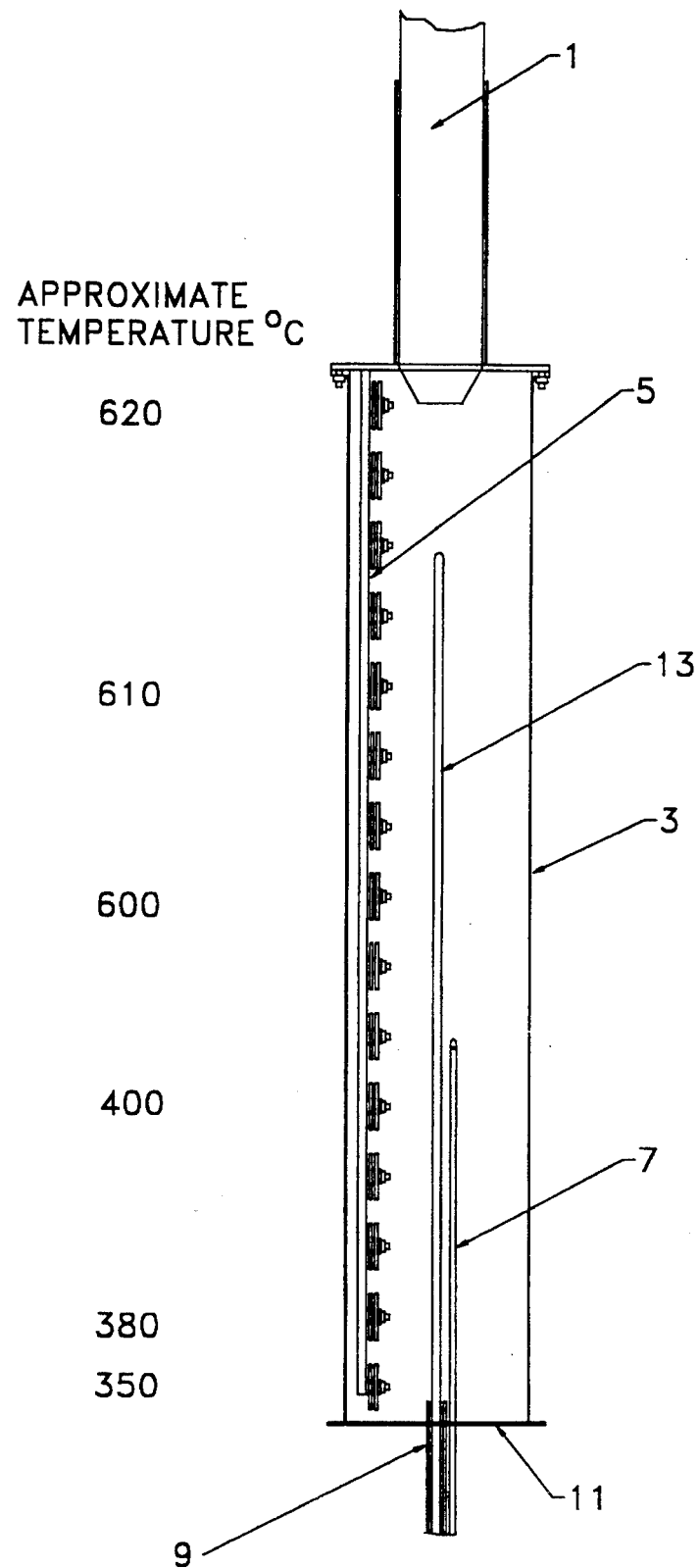
FIG. 1 shows the apparatus containing the metal samples which was employed for testing the materials and coatings of this invention.

The materials and coatings of this invention are useful as materials of construction for any part of a hydrothermal oxidation system that will be exposed to the harsh conditions of the process. Such systems typically contain greater than 50 mole percent water, together with oxygen, carbon dioxide, and a wide range of acids, bases, and salts. In particular, the materials and coatings of this invention have been found to be highly resistant to systems encountered in the process of supercritical water oxidation. They can be used in the construction of reactors, linings, pump parts, piping or tubing, nozzle parts, vessels, tanks, filters, baffles, valve parts and gaskets, for example.

The materials and coatings of this invention find utility in a wide variety of hydrothermal oxidation conditions. At temperatures above about 300° C., the environment of a hydrothermal oxidation process is such that the materials and coatings of this invention are a very suitable material of construction. The materials and coatings of this invention are further suitable at a wide range of pressures ranging from the sub- to the supercritical of about 27.5 bar (400 psi) to above about 1,000 bar (15,000 psi).

The materials and coatings of this invention find utility in a wide variety of reactor systems, including vessel reactors, pipe reactors, and hydraulic column reactors (deep well reactors).

The chemical environment of supercritical water oxidation when used for waste processing will frequently include corrosive materials which comprise at least one moiety selected from the group consisting of Cl, $SO_4$, $NO_3$, $PO_4$, $BO_2$, Br, OH, $CO_3$, F and at least one moiety selected from the group consisting of H, Na, K, Ca, Mg, Ce, Pb and Zn. Examples of such corrosive materials include the mineral acids HCl, HF, $H_2SO_4$, $HNO_3$, and $H_3PO_4$, the alkaline materials NaOH and $Na_2CO_3$, and various salts with cations such as Na, K, Ca, Mg, Ce, Pb and Zn. Most commonly, the corrosive material comprises at least one selected from the group consisting of HCl, $H_2SO_4$, NaOH, $Na_2CO_3$ and at least one sodium salt.

EXAMPLES

The examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

Example 1

Iridium and a number of other metals and alloys were tested for corrosion resistance in a series of tests. The environment tested was characterized by oxidation of a cutting fluid known as Trimsol, a trademark of the Master Chemical Corporation, Perrysburg, Ohio. In addition to its primary hydrocarbon constituents, Trimsol contains about 10 wt % chlorine, 1 wt % sulfur and ½ wt % sodium, so that upon oxidation a mixture of hydrochloric acid, sulfuric acid, and sodium sulfate will form (sodium sulfate is stable over sodium chloride at process conditions). In addition, low levels of the chlorides of cerium, lead, and zinc were introduced to simulate metallic contaminants which might be present in an SCWO process treating mixed organic-radioactive waste. These metals are expected to form oxides or sulfate or chloride salts at process conditions.

The setup used for the tests is shown in FIG. 1. The equipment depicted was situated within a vessel capable of high-pressure, high-temperature operation. The system operating pressure was about 3400 psi. A downward pointing nozzle 1 introduced a mixture of supercritical water, air, metals solution, and Trimsol into a chamber 3 approximately 7 inches in inside diameter. Various metal corrosion samples were mounted on a rack 5 at different axial positions within the chamber 3. The streams mixed upon leaving nozzle 1 and reaction commenced, achieving a final reaction temperature of at least 620° C. Acids, salts and oxides formed within the reaction zone. Some of the salts and oxides adhered to the surfaces within the chamber, including on the corrosion samples. For the feed rates used in these tests, oxidation of Trimsol resulted in approximately 9000 mg/kg of HCl, 1600 mg/kg of $H_2SO_4$, and 1200 mg/kg of $Na_2SO_4$ on a gas free basis (i.e., excluding $N_2$, $O_2$, and $CO_2$). The reacted process stream continued in downflow until it entered the cool-down zone, which was maintained by a separate stream of cold water introduced by tube 7. The cold stream diluted the HCl content from 9000 mg/kg down to about 5000 mg/kg. The process stream continued along its downward path until it reached the approximate location of the exit tube 9. At this point, the process stream mixed with cool dilute sodium hydroxide or sodium bicarbonate entering at the bottom of the chamber 11, and was neutralized. The warm mixed stream exited the chamber through exit pipe 9. The axial temperature profile in the chamber was monitored by thermocouples located within a central thermowell 13. The approximate temperatures at several locations along the chamber are indicated in FIG. 1.

Iridium was present at two locations along the corrosion rack. Table 1 presents the exposure data and results for these samples as well as platinum, platinum alloyed with 10 wt % iridium (Pt/Ir), platinum alloyed with 30 wt % rhodium (Pt/Rh), and the high nickel alloys which have been commonly used in SCWO work, Alloy 625, Alloy C276, and Alloy C22. Some of the samples were exposed for only 60 hours, being removed or lost entirely after this time period due to severe corrosion. The non-iridium samples saw conditions very similar to those of the iridium at the corresponding approximate temperature. Iridium clearly outperformed all of the other materials in the table. The iridium wires actually gained a very slight amount of weight, 0.06% in both cases, most likely due to the formation of a thin protective layer at the surface. This layer may be comprised of an iridium oxide or an iridium hydroxide or otherwise based on an iridium (III) or an iridium (IV) compound.

TABLE 1

Corrosion Results in Acidic Trimsol Environment

| Material | Exposure Hours | Temp. °C. | Corrosion rate mil/year | Sample form inches |
|---|---|---|---|---|
| Iridium | 120 | 620 | 0 | 0.02 OD wire |
| Platinum | 120 | 610 | 2 | 0.02 OD wire |
| Pt/Ir | 120 | 610 | 5 | 0.02 OD wire |
| Pt/Rh | 120 | 610 | 1 | 0.02 OD wire |
| 625 | 120 | 605 | 460 | 1.25 OD disk, 0.121 thk |
| C276 | 120 | 605 | 1290 | 1.25 OD disk, 0.121 thk |
| C22 | 120 | 605 | 580 | 1.25 OD disk, 0.121 thk |
| Iridium | 120 | 380 | 0 | 0.02 OD wire |
| Platinum | 60 | 400 | 45 | 0.02 OD wire |
| Pt/Ir | 120 | 400 | 92 | 0.02 OD wire |
| Pt/Rh | 120 | 400 | 190 | 0.02 OD wire |
| 625 | 60 | 395 | 550 | 1.25 OD disk, 0.121 thk |
| C276 | 60 | 395 | 480 | 1.25 OD disk, 0.121 thk |
| C22 | 120 | 395 | 230 | 1.25 OD disk, 0.121 thk |

Example 2

Two iridium samples, a 0.02 inch OD wire and a coupon 25 mm square by 1 mm thick, were exposed to several SCWO environments at about 600° C. and 235 bar. The results of this series of tests are shown in Table 2. Hydrochloric and sulfuric acid levels are given in ppm, which signifies milligrams of acid per kilogram of water present. Sodium chloride and sodium sulfate salts were present as solid deposits. Over the course of the various runs, slight weight changes, both positive and negative, were observed. This may be due to small amounts of scale accumulating and shedding as temperature or chemical conditions were changed. The total percentage weight loss (last 2 rows of the table) is less for the coupon due to the lower exposure time and the considerably greater mass. For both samples, however, the cumulative corrosion rate is calculated to be 0.5 mil/year, a very acceptable rate for long term commercial application.

TABLE 2

Exposure of Iridium at Approximately 600° C.

| Run | Sample | Environment | Exposure Hrs | Mass Change, % |
|---|---|---|---|---|
| 554 | Wire | 400 ppm HCl, NaCl, $Na_2SO_4$ | 11 | −0.04 |
| 555 | Wire | 2000 ppm $H_2SO_4$, $Na_2SO_4$ | 4 | 0.00 |
| 559 | Wire | 1000 ppm $H_2SO_4$, $Na_2SO_4$ | 6.5 | +0.11 |
| 560 | Coupon | NaCl | 1.5 | −0.01 |
| 561 | Wire | NaCl | 1.5 | −0.22 |
| 561 | Coupon | NaCl | 1.5 | 0.00 |
| 562 | Wire | $Na_2SO_4$ | 2 | +0.07 |
| 562 | Coupon | $Na_2SO_4$ | 2 | 0.00 |
| 563 | Wire | $Na_2SO_4$ | 2 | −0.11 |
| 563 | Coupon | $Na_2SO_4$ | 2 | 0.00 |
| 564 | Wire | $Na_2SO_4$ | 4 | +0.15 |
| 564 | Coupon | $Na_2SO_4$ | 4 | 0.00 |
| Total | Wire | | 31 | −0.04 |
| Total | Coupon | | 11 | −0.00 |

It is possible that a protective layer comprised of an iridium oxide or an iridium hydroxide or otherwise based on an iridium (III) or an iridium (IV) compound is responsible for the high corrosion resistance observed in the preceding examples. The presence of any protective layer naturally formed on the iridium prior to or during exposure to the process is considered to be part of the present invention.

A drawback of utilizing a precious metal such as iridium is the high cost of the material. Only relatively small parts of the pure metal are likely to be economically viable. However, it is possible to utilize iridium or an iridium alloy as a coating on more affordable materials such as the commercially available engineering alloys, e.g., steel, stainless steel or high nickel alloy for the base metal part. Here, the base metal part would provide the needed structural integrity and the iridium or iridium-alloy coating would provide the required corrosion resistance. Several techniques may be used for applying such coatings. A first technique, "physical vapor deposition," consists of using iridium atoms in the gas phase, for example from a high temperature plasma, and laying down the iridium atoms on the base metal surface. Here, the iridium atoms are directed by a "driving force," such as an electric field.

A second technique for coating is known as "chemical vapor deposition" and consists of a chemical reaction which is caused to occur and which lays down iridium on the base-metal surface, i.e., the chemical reaction liberates iridium and lays it on the base metal surface.

A third coating technique, known as "thermal spray" consists of heating a stream of iridium powder to a temperature sufficient to partially or completely melt the powder. The spray of melted powder impacts on the base metal surface and rapidly cools to form a layer of solid.

A fourth coating technique, known as "diffusion coating" consists of immersing the base metal component in iridium powder and heating up the metal such that solid iridium transfers to the surface of the base metal.

A fifth coating technique, known as "electroplating" involves immersing the part to be coated in a solution containing iridium. The iridium is then deposited on the base part by electrochemical means.

Also, other methods of applying iridium or iridium alloy coatings, which are known in the art, are considered within the scope of the present invention.

With the exception of "Pt/Ir," platinum alloyed with 10 wt % iridium (see Example 1), the iridium tested was pure iridium with a possible protective layer. In Example 1, the Pt/Ir sample possibly experienced corrosion due to the high platinum content. Other iridium alloys would likely exhibit similar corrosion resistance to the iridium or iridium oxide. For instance, iridium platinum alloys with an iridium content of greater than about 50 wt. % iridium would likely experience the same corrosion resistant tendencies as pure iridium.

Although the invention has been described with reference to its preferred embodiments, those of skill in the art may from this description appreciate changes and modifications that can be made herein which do not depart from the scope and spirit of the invention as described in the claims hereafter.

We claim:

1. A process for hydrothermal oxidation of combustible material in a hydrothermal oxidation apparatus, in which, during at least part of the oxidation, corrosive material is present and contacts the apparatus over a contact area on the apparatus, the process comprising:

contacting in an aqueous phase the combustible material and an oxidizing agent under conditions suitable to cause oxidation of the combustible material;

wherein the oxidation is at a temperature in the range of about 300° C. to about 800° C. and at pressures from about 27.5 bar (400 psi) to about 1000 bar (15,000 psi); and wherein the contact area comprises iridium to provide corrosion resistance from said corrosive material in said contact area.

2. The process of claim 1, wherein the corrosive material comprises at least one moiety selected from the group consisting of Cl, $SO_4$ and OH and at least one moiety selected from the group consisting of H, Na, K, Ca, Mg, Ce, Pb and Zn.

3. The process of claim 2, wherein the corrosive material comprises (i) at least one selected from the group consisting of HCl, $H_2SO_4$, NaOH, $Na_2CO_3$ and (ii) a sodium salt.

4. The process of claim 1, wherein the aqueous phase containing the corrosive material and oxidizing agent contains greater than 50 mole percent water.

5. The process of claim 4, wherein the aqueous phase further contains oxygen, carbon dioxide, and at least one selected from the group consisting of acids, bases and salts.

6. The process of claim 1, wherein the oxidation apparatus is a reactor selected from the group consisting of vessel reactors, hydraulic column reactors, and pipe reactors.

7. The process of claim 1, wherein the contact area comprises a base metal overlaid with an iridium coating.

8. A process for hydrothermal oxidation of combustible material in a hydrothermal oxidation apparatus, in which, during at least part of the oxidation, corrosive material is present and contacts the apparatus over a contact area on the apparatus, the process comprising:

contacting in an aqueous phase the combustible material and an oxidizing agent under conditions suitable to cause oxidation of the combustible material;

wherein the oxidation is at a temperature in the range of about 300° C. to about 800° C. and at pressures from about 27.5 bar (400 psi) to about 1000 bar (15,000 psi); and wherein the contact area comprises an iridium based protective layer to provide corrosion resistance from said corrosive material in said contact area.

9. The process of claim 8, wherein the corrosive material comprises at least one moiety selected from the group consisting of Cl, $SO_4$ and OH, and at least one moiety selected from the group consisting of H, Na, K, Ca, Mg, Ce, Pb and Zn.

10. The process of claim 9, wherein the corrosive material comprises (i) at least one selected from the group consisting of HCl, $H_2SO_4$, NaOH, $Na_2CO_3$ and (ii) a sodium salt.

11. The process of claim 8, wherein the aqueous phase containing the corrosive material and oxidizing agent contains greater than 50 mole percent water.

12. The process of claim 11, wherein the aqueous phase further contains oxygen, carbon dioxide, and at least one selected from the group consisting of acids, bases and salts.

13. The process of claim 8, wherein the oxidation apparatus is a reactor selected from the group consisting of vessel reactors, hydraulic column reactors, and pipe reactors.

14. The process of claim 8, wherein the iridium protective layer is formed in-situ by contacting an iridium surface with an oxidizing agent under conditions suitable to cause oxidation of the iridium surface.

15. The process of claim 14, wherein the oxidation of the iridium surface comprises contacting the iridium surface with an aqueous phase which includes the oxidizing agent at a temperature of about 300° C. to about 800° C. and a pressure from about 27.5 bar to about 1000 bar.

16. A process for hydrothermal oxidation of combustible material in a hydrothermal oxidation apparatus, in which, during at least part of the oxidation, corrosive material is present and contacts the apparatus over a contact area on the apparatus, the process comprising:

contacting in an aqueous phase the combustible material and an oxidizing agent under conditions suitable to cause oxidation of the combustible material;

wherein the oxidation is at a temperature in the range of about 300° C. to about 800° C. and at pressures from about 27.5 bar (400 psi) to about 1000 bar (15,000 psi); and wherein the contact area comprises an iridium alloy to provide corrosion resistance from said corrosive material in said contact area.

17. The process of claim 16, wherein the corrosive material comprises at least one moiety selected from the group consisting of Cl, $SO_4$ and OH, and at least one moiety selected from the group consisting of H, Na, K, Ca, Mg, Ce, Pb and Zn.

18. The process of claim 17, wherein the corrosive material comprises (i) at least one selected from the group consisting of HCl, $H_2SO_4$, NaOH, $Na_2CO_3$ and (ii) a sodium salt.

19. The process of claim 16, wherein the aqueous phase containing the corrosive material and oxidizing agent contains greater than 50 mole percent water.

20. The process of claim 19, wherein the aqueous phase further contains oxygen, carbon dioxide, and at least one selected from the group consisting of acids, bases and salts.

21. The process of claim 16, wherein the oxidation apparatus is a reactor selected from the group consisting of vessel reactors, hydraulic column reactors, and pipe reactors.

22. The process of claim 16, wherein the contact area comprises a base metal overlaid with an iridium alloy coating.

23. The process of claim 16, wherein the iridium alloy comprises an iridium platinum alloy.

24. The process of claim 23, wherein the iridium platinum alloy comprises greater than about 50 wt. % iridium.

* * * * *